United States Patent [19]

Kagi

[11] Patent Number: 5,497,415
[45] Date of Patent: Mar. 5, 1996

[54] AUTOMATIC RELEASE DEVICE FOR AUTOMATICALLY RELEASING THE HOLD-ON SETTING OF AN OUTSIDE LINE CALL, AND TRANSFER METHOD FOR AN OUTSIDE LINE CALL

[75] Inventor: Ichiro Kagi, Shimane, Japan

[73] Assignee: Shimane Sanyo Industrial Co., Ltd., Shimane, Japan

[21] Appl. No.: 37,001

[22] Filed: Mar. 25, 1993

[51] Int. Cl.$^6$ .................................................. H04M 3/20
[52] U.S. Cl. .................... 379/393; 379/387; 379/162; 379/212
[58] Field of Search ................................ 379/393, 387, 379/202, 203, 204, 205, 206, 210, 211, 212, 162, 163

[56] References Cited

U.S. PATENT DOCUMENTS

| | | | |
|---|---|---|---|
| 4,232,198 | 11/1980 | Warman | 379/205 |
| 4,551,582 | 11/1985 | Matsuo | 379/393 |
| 4,656,625 | 4/1987 | Nojiri | 379/202 |
| 4,674,118 | 6/1987 | Tosto | 379/393 |
| 4,852,158 | 8/1989 | Tsurusaki et al. | 379/393 |
| 4,870,680 | 9/1989 | Ohtsuka et al. | 379/163 |

*Primary Examiner*—Jeffery A. Hofsass
*Assistant Examiner*—Jacques M. Saint-Surin
*Attorney, Agent, or Firm*—Darby & Darby

[57] ABSTRACT

An automatic release device for automatically releasing hold-on setting of an outside line call wherein a first telephone when having an outside line call from a second telephone and set to the hold-on state can be released from the hold-on setting by use of a sensing means detecting signals based on the hook-down at the second telephone slde. Further a transfer method for an outside line call, by using a conference call system served by Telegraph and Telephone Corporations wherein a running outside line call received from a second telephone by a first telephone through outside line wire is set to enable the conference call and the first telephone is set to the hold-on state so as to allow persons at the second and third telephones to talk with each other, wherein a sensing means for detecting signals based on hook-down of either of the second and third telephones is used to release the first telephone from the hold-on state.

5 Claims, 10 Drawing Sheets

AUTOMATIC RELEASE DEVICE FOR AUTOMATICALLY RELEASING THE HOLD-ON SETTING OF AN OUTSIDE LINE CALL, AND TRANSFER METHOD FOR AN OUTSIDE LINE CALL

BACKGROUND OF THE INVENTION

Field of the Invention

The invention relates to an automatic release device for automatically releasing the setting of hold-on of a first telephone holding an outside line call from a second telephone by means of "hook-down" of the second telephone (replacement of the telephone receiver on its cradle), and also to a transfer method for transferring an outside line call received from a second telephone by a first telephone to any other lines by use of the hold-on setting automatic release device together with a "conference call" system (in which a plurality of persons can talk together using the same and single line) served by a Telegraph and Telephone Corporation.

A hold-on setting device for setting a first telephone to the hold-on state holding an outside line call from a second telephone has been provided for various telephone sets or users telephone exchange apparatuses (called "business main exchange" in Japan) and is used when the first telephone is to be temporarily off with the outside line call being kept alive, causing the transmitting person (the second telephone) to hold on the line while an aimed speaker is gotten or the call is transferred to any other lines. The hold-on setting device is operated at the call-receiving side, usually by the receiving person (the person first picked up the telephone receiver of the first telephone) through his depressing the hold-on setting button on the telephone or other manners and may be released from the hold-on setting state at the call-receiving side.

The conventional type of outside line call hold-on setting device is operated of the hold-on setting and its release only by the telephone at the call-receiving side. Release of the hold-on setting is forgettable after the hold-on setting is kept for hours, for example, when the receiving person takes time in getting the aimed speaker after setting the telephone to the hold-on state or such aimed speaker inadvertently fails to be on the line. The transmitting person has to merely hold on the line, having nothing to do in this case and will often hang up after kept waiting long, leading to the problem that the telephone at the call-receiving side is kept in the hold-on set state and cannot use the outside line on which the call has been off.

Another case having the problem that the hold-on setting on the telephone at the receiving side is not released but kept to thereby cause the line to be kept unusable is seen under such circumstance that an outside line call is transferred to any other lines by use of the conference call system served by Telegraph and Telephone Corporations, for example, Trio-phone service by Nippon Telegraph and Telephone Corp., Japan, (telephoning function that three persons can talk together using the same and single line). In this case, a call-receiving person receives an outside line call from a transmitting person, calls up a third person (to whom the outside line call is to be transferred) to establish a three persons call and then set the call-receiving person's telephone to the hold-on state, thereby allowing that transmitting person and the third person (the one to whom the outside line call is to be transferred) to talk with each other.

In the above case of transferring the outside line call by use of the conference call system, when the call between that transmitting person and that third person ends, the hold-on setting on the telephone at the call-receiving person is not released but kept to thereby cause the line to be kept unusable.

Also, when the call-receiving person (the subscriber for the Trio-Phone service) merely replaces the telephone receiver on the cradle (the usual hanging up state), all the telephone communication above is broken. The call-receiving person necessarily needs to have the hold-on setting or keep "on" the telephone by picking up the telephone receiver for the purpose of providing the transfer as above-said. But, in the former (by the hold-on setting), hold-on tones hinders the call between that transmitting person and that third person, and in the latter, the telephone receiver picked up is a bother and does not keep secret any confidential conversation between those persons. Hence, the trio-phone service may be usable only for the three-persons call but is practically unreasonable to be applied for the aforesaid transfer of outside line call.

SUMMARY OF THE INVENTION

An object of the present invention is to provide an automatic release device for automatically releasing the hold-on setting of an outside line call, by which device a first telephone when having at least one outside line call from a second telephone and set to the hold-on state can be automatically released from the hold-on setting through hook-down (or replacement) of the telephone transmitter/receiver on a cradle at the second telephone side, thereby allowing that outside line to be off and enabling the first telephone to receive any other calls from any other persons through the outside line.

The present invention is characterized in an automatic release device for automatically releasing the hold-on setting of an outside line call wherein a first telephone when having an outside line call from a second telephone and set to the hold-on state can be released from the hold-on setting by use of a sensing means detecting signals based on the hook-down at the second telephone side.

The present invention is also characterized in an automatic release device for automatically releasing the hold-on setting of an outside line call, the automatic release device being connected between outside line wires and outside line input terminals at a first telephone having an outside line call from a second telephone through the outside line wire, the automatic release device being provided with: a hold-on relay which is actuated by DTMF signals sent by the first or second telephone during the outside line call to set the first telephone to the hold-on state in relation to the outside line call and a release relay which is actuated by the DTMF signals to release the first telephone from the hold-on state, and a sensing means for detecting signals based on hook-down of the second telephone when the first telephone is in the hold-on state, the sensing means being adapted to actuate the release relay to cut a hold-on loop for the outside line call formed by the hold-on relay.

The present invention is further characterized in a transfer method for an outside line call, by using a conference call system served by Telegraph and Telephone Corporations wherein a running outside line call received from a second telephone by a first telephone through outside line wire is set to the hold-on state in the conference call system by a Telephone Exchange while any other third line is called up, then, that outside line call is released from the hold-on state by the Telephone Exchange to enable the conference call, and also using a hold-on relay, which is connected between the outside line wire and outside line input terminals at the first telephone and to be actuated by DTMF signals sent by the first telephone or the third telephone subjected to the conference call, in order to set the first telephone to the hold-on state in relation to the outside line wire so as to allow persons at the second and the third telephones to talk with each other, wherein a sensing means for detecting signals based on hook-down of either of the second and third telephones is used to actuate a hold-on setting release relay, which is adapted to cut a hold-on loop formed by the hold-on relay, to release the first telephone from the hold-on setting in relation to the outside line wire.

DETAILED DESCRIPTION OF THE INVENTION

The "telephones" referred to in the specification may be general telephone sets commercially available from any makers of communication apparatuses or Telegraph and Telephone Corporations and are not limited to any particular devices. The hold-on setting for the telephones is carried out by depressing the hold-on button when the telephone has therein the hold-on function. The hold-on setting for the telephones may alternatively be carried out by actuation of any device having the hold-on function and connected to the telephones. The hold-on function is to catch the outside line when a corresponding telephone has a call thereon, so that when the receiver of such telephone is replaced on (hook-down) on the cradle, it does not cut the running outside line but keeps the hold-on setting therefor. In case of using a general telephone set, the hold-on setting is carried out by depressing the hold-on button on the telephone to actuate the hold-on relay (H relay) in the local line circuit to form a hold-on loop. Alternatively, a separate hold-on relay may be provided to be actuated by DTMF signals from telephones or actuated by an electrically connected switch.

The "sensing means" is that when a first telephone has an outside line call from a second telephone and is set to the hold-on state in relation to the outside line, the sensing means detects signals based on the hook-down of the receiver at the second telephone to release the first telephone from the hold-on setting, leading to clear-down state. Release of the hold-on state may be carried out by the sensing means itself or in such manner of actuating the hold-on setting release relay by outputs from the sensing means, or cutting the hold-on loop by logical circuit. The signals based on the hook-down at the second telephone side are, for example, reversal of polarity or interrupted tone of 400 Hz forming busy-back tone. Means for sensing the signals may use thyristor or photocoupler IC which instantly cuts the hold-on loop correspondingly to reversal of polarity due to the hook-down. Also, means for sensing the interrupted tone of 400 Hz may be touch-tone decoder. These means may be used solely, or together with a sensing means for detecting busy-back tone of 400 Hz in consideration of such case that polarity is not reversed upon the clear-down state because of free-line at the call-receiving side. The sensing means may be assembled in the telephone body or separately formed and connected thereto.

The "DTMF signals" represent numbers by combinations of 2 frequencies in voice frequency band and are usually used in pushbutton phones. Also, a telephone having function of PB conversion tone may provide the DTMF signals. The DTMF signals to be used in the present invention should not be limited to any particular features but may be preferably a combination of two or more DTMF signals to prevent malfunction. The DTMF signals may be so set that two pushbuttons 7 and # are depressed to actuate the hold-on relay and the hold-on setting release relay.

The "hold-on relay" is that when actuated forms a hold-on loop to provide the hold-on state. The "hold-on setting release relay" is that cuts the hold-on loop formed by the hold-on relay to allow a corresponding telephone to return to the state enabling the telephone talk. The relays may be actuated by the DTMF signals in such manner as actuated alternately with flip-flap (FF) using the same signals or actuated by separate signals.

The "A.C. relay" is to be connected with a transmitting circuit which inputs signals of required frequency to call signal of telephones. The frequency is generally 16 Hz and preferably 15–20 Hz, and selected accordingly to have separate ring tone for the call signal of telephones from that of an outside line call. The A.C. relay may be adapted to transmit signals to provide ringing intervals with different cycles. The A.C. relay is actuated by the DTMF signals from a telephone at a transmitting side in an outside line call, and the DTMF signals are to be different from those for actuating the hold-on relay.

The "Conference Call system" (the Trio-Phone service in Japan) is to be served by Telegraph and Telephone Corporations to their subscribers, allowing more than three persons with their respective telephones to talk together using a single line.

EMBODIMENTS

Next, the present invention will be further detailed with referring to examples shown in the attached drawings.

Figure 1:
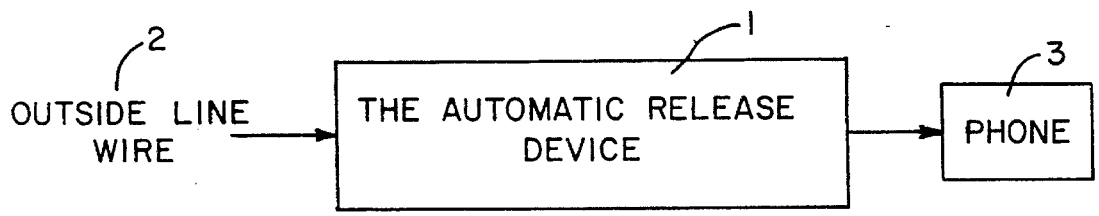
FIG. 1 is a schematic diagram showing connection of the automatic release device of hold-on setting of outside line call according to the present invention.

FIG. 1 is a schematic diagram showing connection of the automatic release device 1 of hold-on setting of outside line call according to the present invention. The automatic release device 1 is connected between outside line wire 2

(L1, L2) and outside line input terminals at a local telephone 3. When the telephone 3 (a first side) receives an outside line call through the outside line wire 2 or transmits an outside line call through the outside line wire 2, and is set to the hold on state in relation to the outside line call, the automatic release device 1 will automatically release the hold-on setting when a transmitting or receiving side (a second side) of that outside line call replaces (hook-down) the telephone receiver on the cradle, thereby ending the outside line call.

Figure 2:
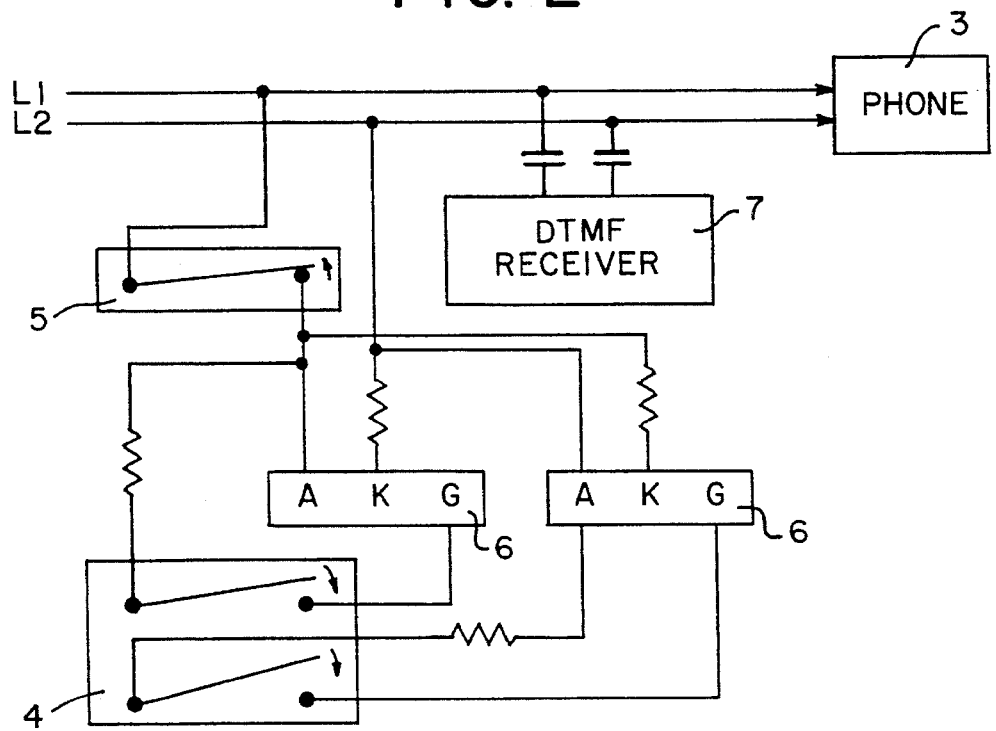
FIG. 2 is a circuit diagram showing an example of the present invention.

FIG. 2 shows an example of the present invention, wherein provided are a hold-on relay 4, hold-on setting release relay 5 and two thyristors 6. Hold-on setting or release of the hold-on setting can be performed by DTMF signals from the telephone 3. Also, hold-on setting can be released automatically by clear-down signals from the outside line wire 2 which clear-down signals are generated through the hook-down of telephone receiver at the second side. In detail, when a person talks over the telephone 3 with the second side and depresses two pushbuttons on the telephone, for example, 7 and *, this actuates the hold-on relay 1 and causes electric current to flow in the gate G of the thyristor 6 in a short time, so that properties of the thyristor 6 forms a loop of the outside line wire L1, L2 to provide the state of hold-on setting. When the pushbuttons 7 and * on the telephone 3 are depressed again, the hold-on setting release relay 5 is actuated in a short time to cut the formed loop of the outside line wire and release the hold-on setting. Operation of the hold-on relay 4 and the hold-on setting release relay 5 is controlled by a DTMF receiver 7 connected to the outside line wire. When the push buttons 7 and * are first depressed, the hold-on relay 5 is actuated and when the pushbuttons are depressed again, the hold-on setting release relay 5 is actuated. These operations are alternately repeated by flip-flap IC (FF.IC).

When the second side makes the hook-down in the state of hold-on setting, polarity of the outside line wire 2 is reversed. The hold-on loop held by the thyristor 6 is cut by the thyristor 6 itself, leading automatically to the clear-down state. In detail, cathode (K) of the thyristor 6 is applied with backward voltage to cut the hold-on loop, thereby releasing the hold-on setting. Hence, the telephone 3 even in the state of hold-on setting is automatically ended of the call to be able to receive any other calls from others. The example provides two thyristors 6 as having opposite polarity to each other since polarity of the outside line wire 2 is not fixed when the automatic release device 1 is connected to the telephone 3 and either of the two thyristors 6 may perform the above function. A single thyristor 6 may be used when connected in conformity with a specific polarity of the outside line wire 2. Also, the example is so constructed not to emit hold-on tone in the state of hold-on setting because in use of the conference call, i.e., the Trio-Phone service provided by Telegraph and Telephone Corporations enabling three-persons call, when the first side (the first telephone) sets the telephone to the hold-on state without participating in the three-persons call, the hold-on tone if provided will bother the conference call between the second and third sides. Without use of the conference call service, the hold-on tone may be provided. The hold-on tone is preferable to be adjustable in volume in consideration of possibilities of use of the conference call service.

Figure 3:
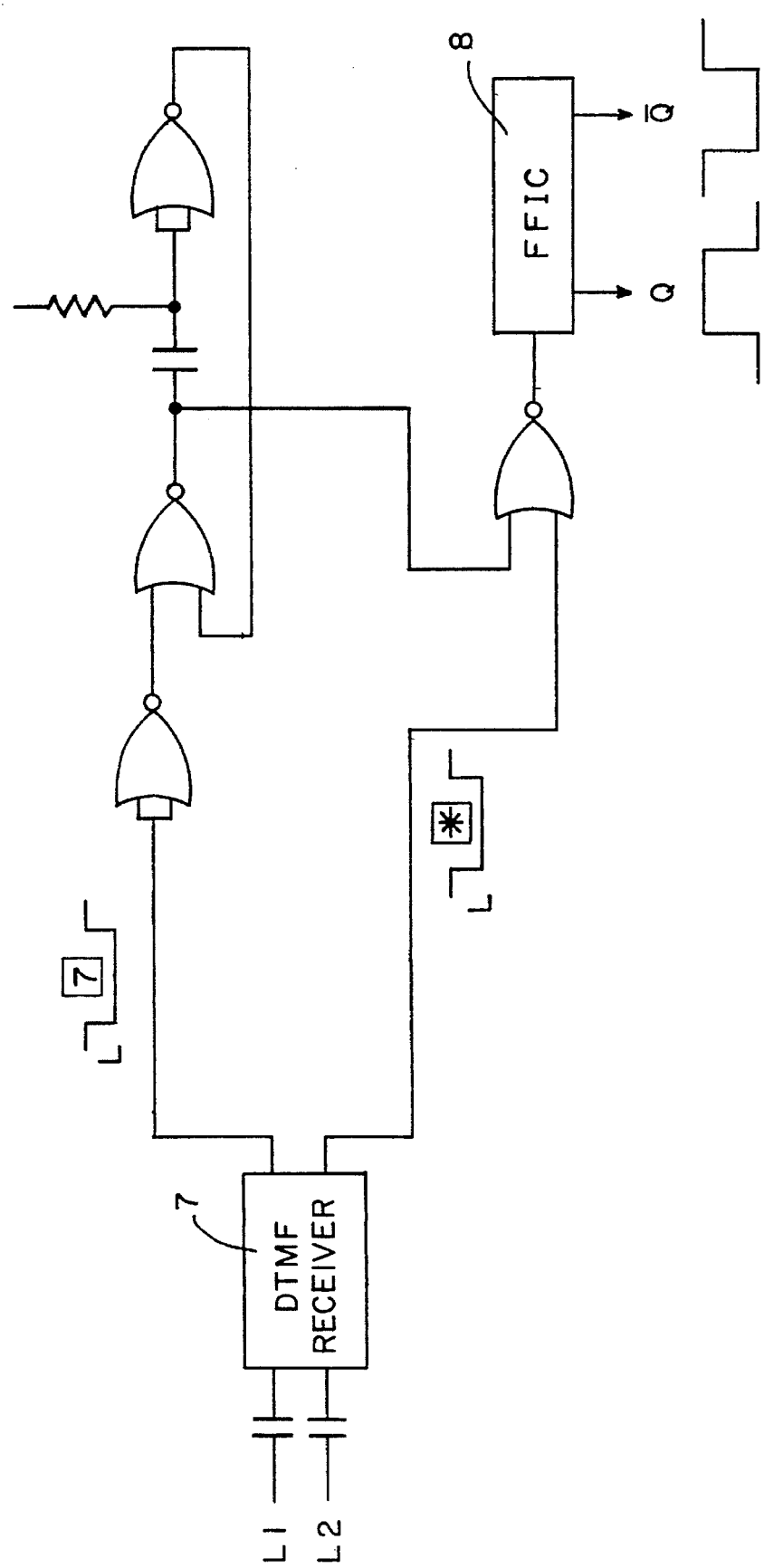
FIGS. 3, 4(a) and 4(b) are diagrams of IC for actuating the hold-on relay and the hold-on setting release relay.
Figure 4A:
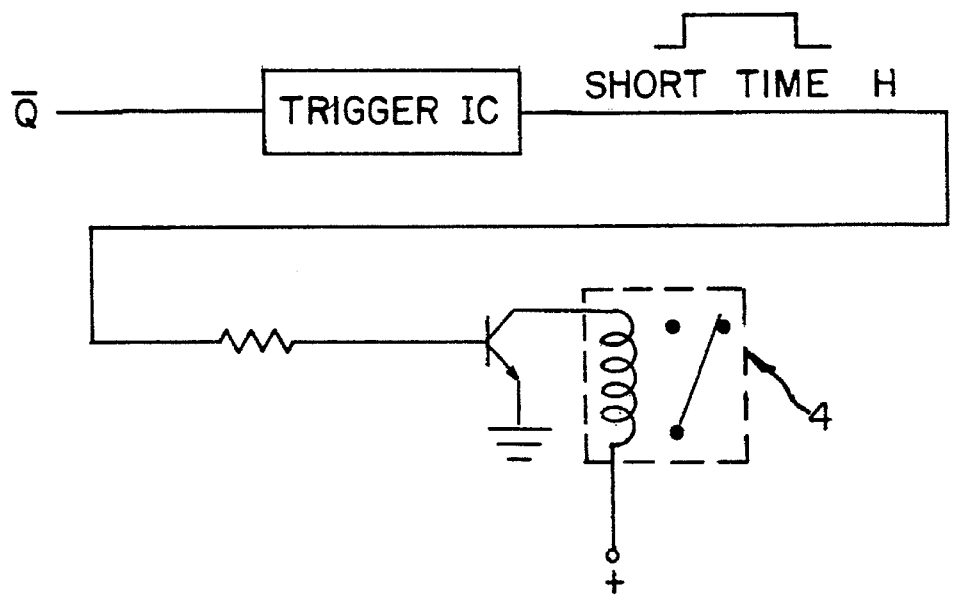
Figure 4B:
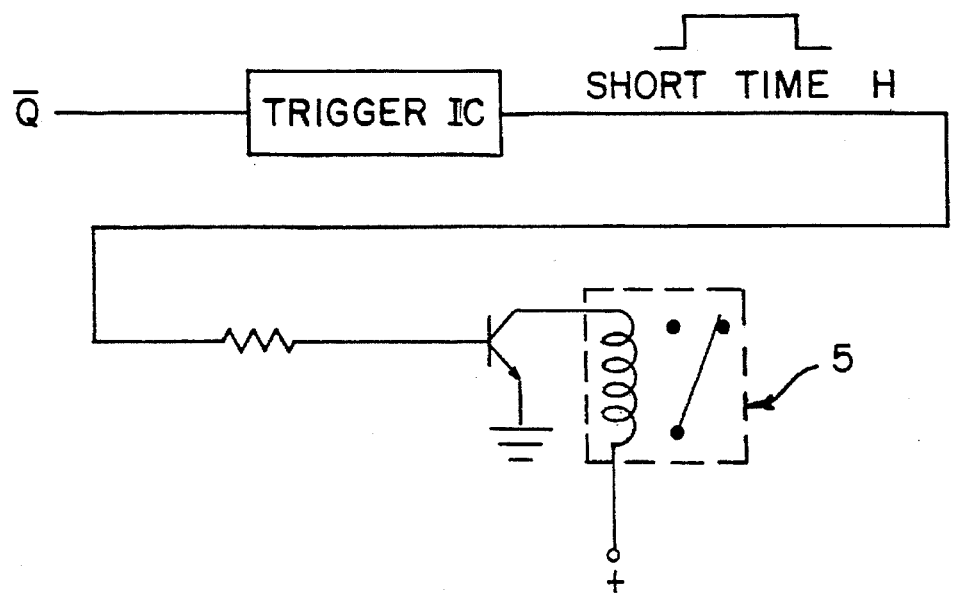

FIG. 3 is a circuit diagram of IC to be actuated by DTMF signals, showing operation of a DTMF receiver 7 connected to the outside line wire 2 (L1, L2). The pushbuttons 7 and * on the telephone 3 are depressed to cause the DTMF receiver 7 to emit two DTMF signals and input them to a flip-flap (FF) IC 8 from which outputs related to the two DTMF signals can be extracted alternately. Data (Q,Q) output alternately by the FF.IC 8 actuates alternately the hold-on relay 4 and the hold-on setting release relay 5 in the circuit shown in FIGS. 4(a) and 4(b) in a short time.

Figure 5:
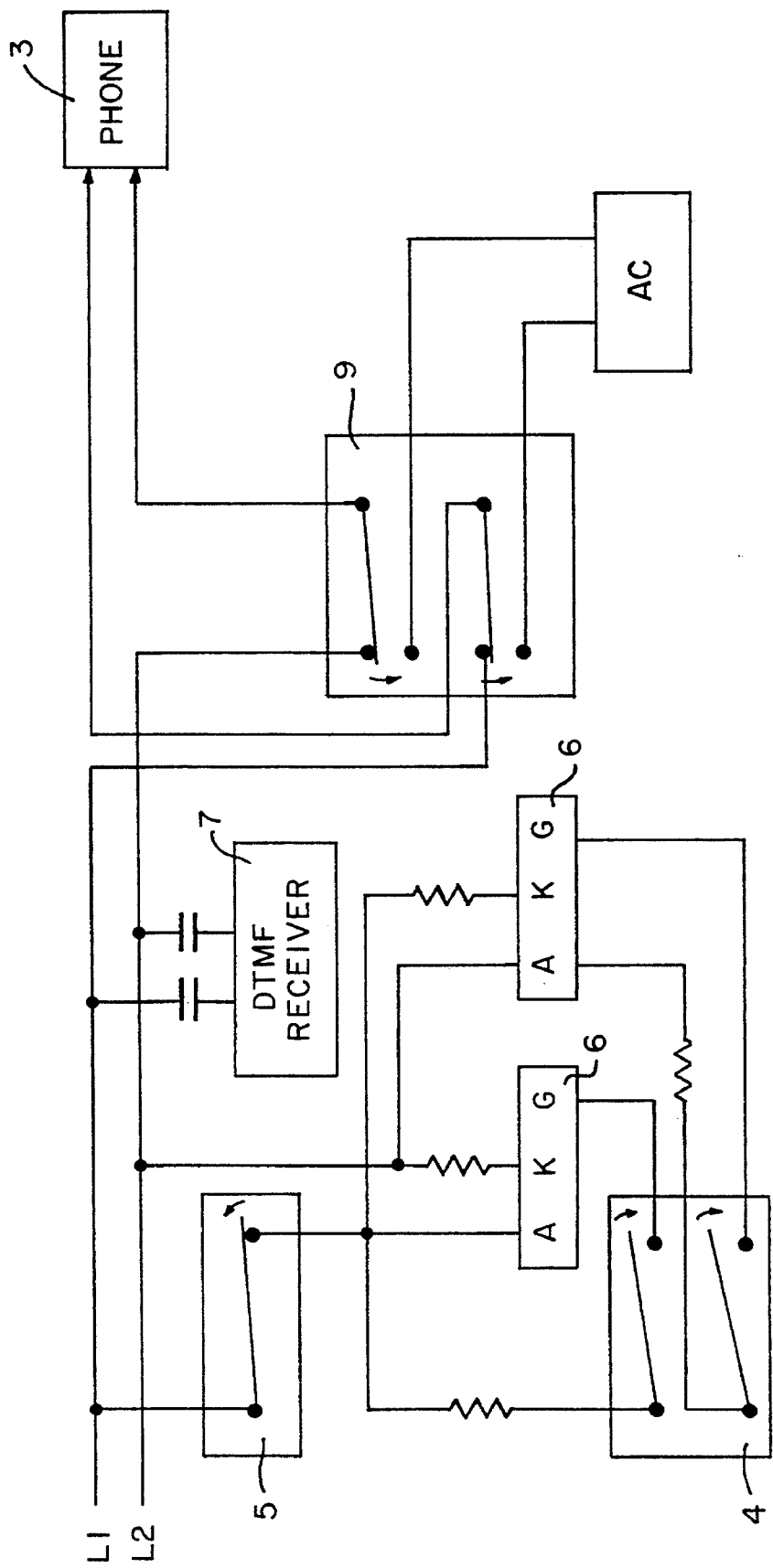
FIG. 5 is a circuit diagram showing another example of the present invention.
Figure 6:
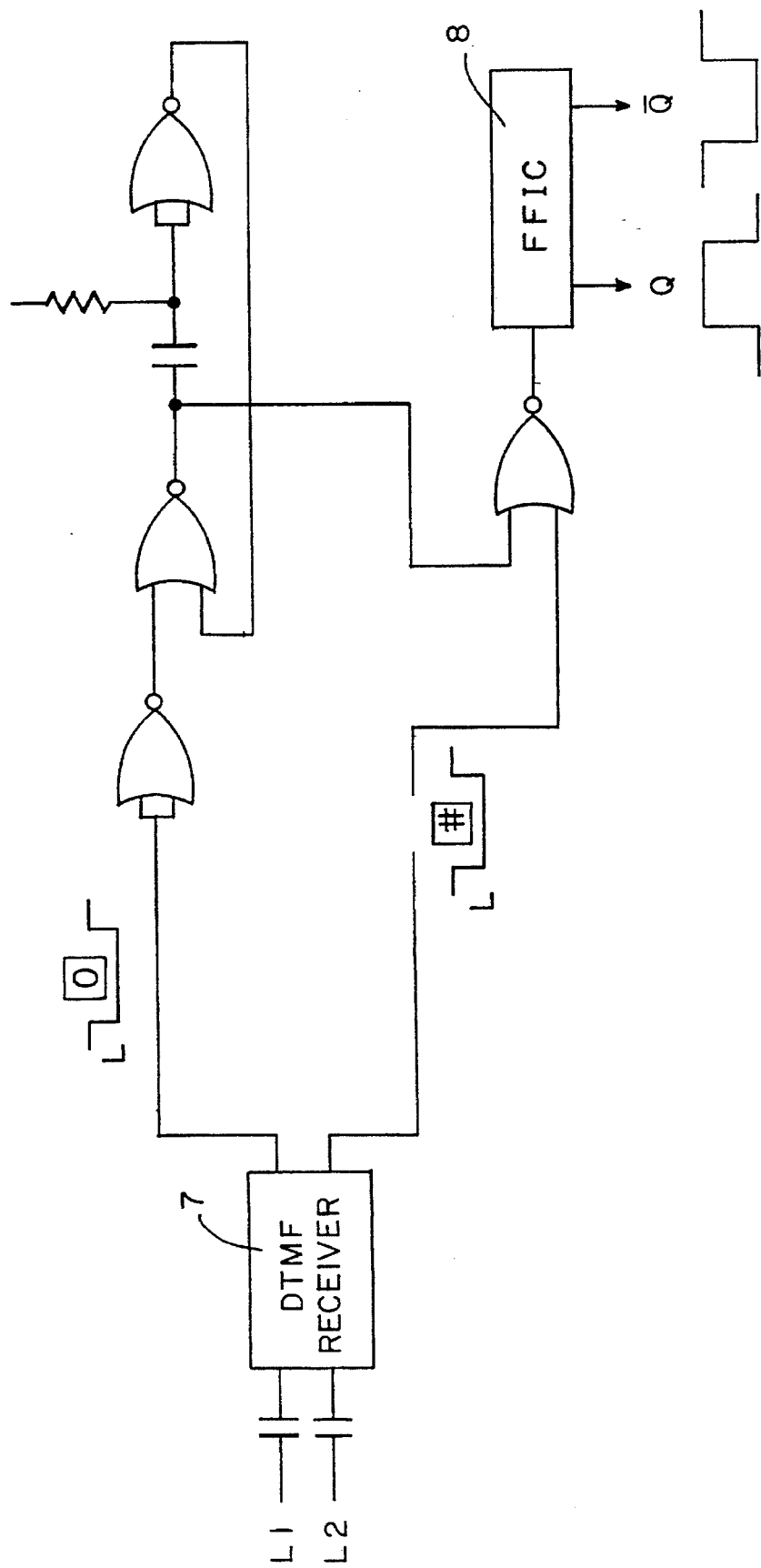
FIGS. 6 and 7 are diagrams of IC for actuating the A.C. relay.
Figure 7:
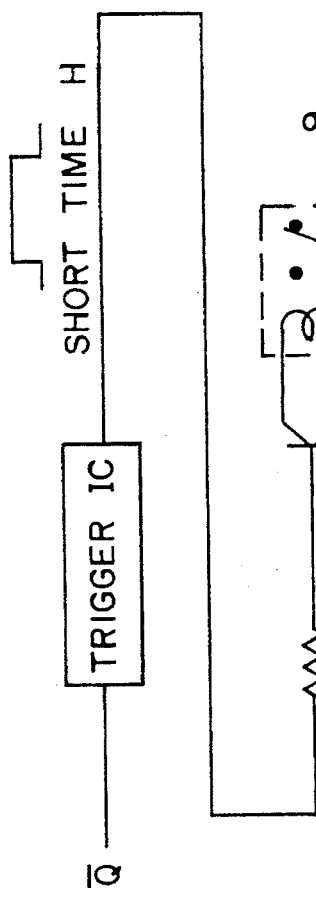

FIG. 5 shows a modified example of the present invention wherein a A.C. relay 9 is added in the circuit shown in FIG. 2. The A.C. relay 9 is provided for allowing a person at the second side to ring the bell of the telephone 3 at the first side when the second side waits long in the state of hold-on setting of the telephone 3. As shown in FIGS. 6 and 7, the second side depresses two pushbuttons 0 and # to actuate the A.C. relay 9 with DTMF signals through the outside line wire to send bell voltage (AC.75 V, 15–20 Hz) to the telephone 3, thereby ringing the bell of the telephone 3 at the first side. The A.C. relay 9 is controlled by the DTMF receiver 7 and actuated by the signals from depression of 0 and # pushbuttons to ring the bell every few seconds intermittently.

Figure 8:
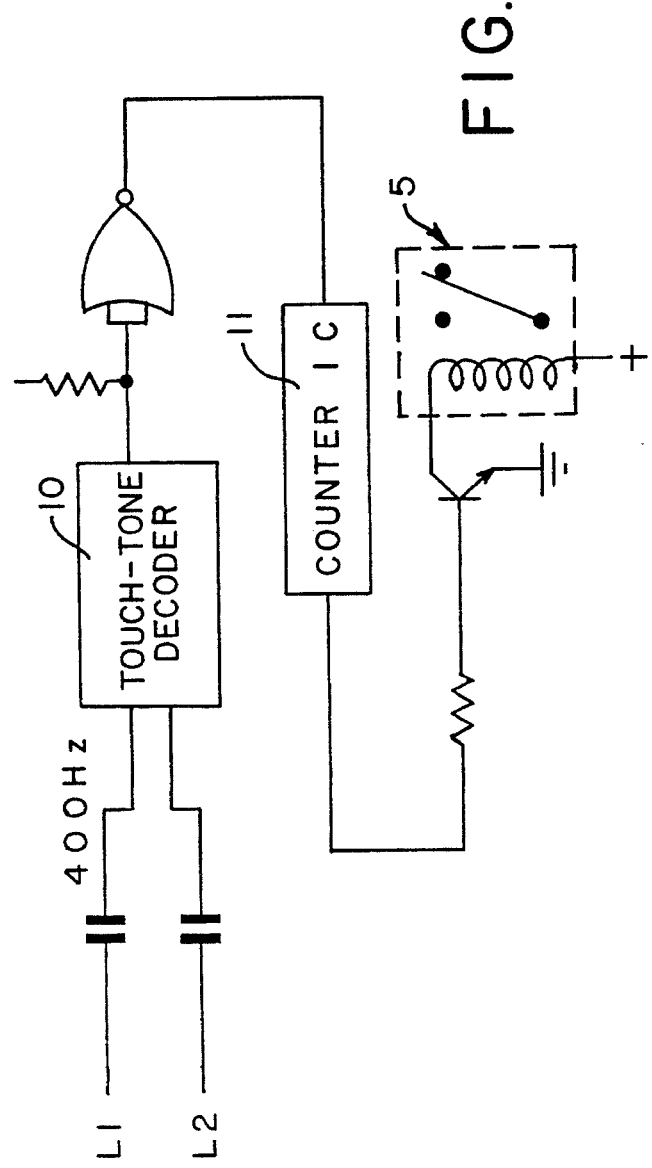
FIGS. 8 and 9 are circuit diagrams for detecting the hook-down of telephones.

FIG. 8 shows a further modified example of the present invention, providing a touch-tone decoder 10 which detects busy-back tone (interrupted tone, 400 Hz in Japan), i.e., catches for few seconds the intermittently emitted busy-back tone 400 Hz when the second side makes the hook-down of the second telephone in the state of hold-on setting of the first telephone, and actuate the hold-on setting release relay 5 shown in FIGS. 2 or 5 to release the hold-on setting. The decoder 10 is preferably used together with the foregoing thyristor 6 to ensure the detection of the hook-down of the second side telephone. The example uses a counter IC 11 to count the intermittently emitted busy-back tone 400 Hz to actuate the hold-on setting release relay 5 with any numbers set by the counting, thereby preventing malfunction of the relay 5 based on any other tone 400 Hz than the busy-back tone.

Figure 9:
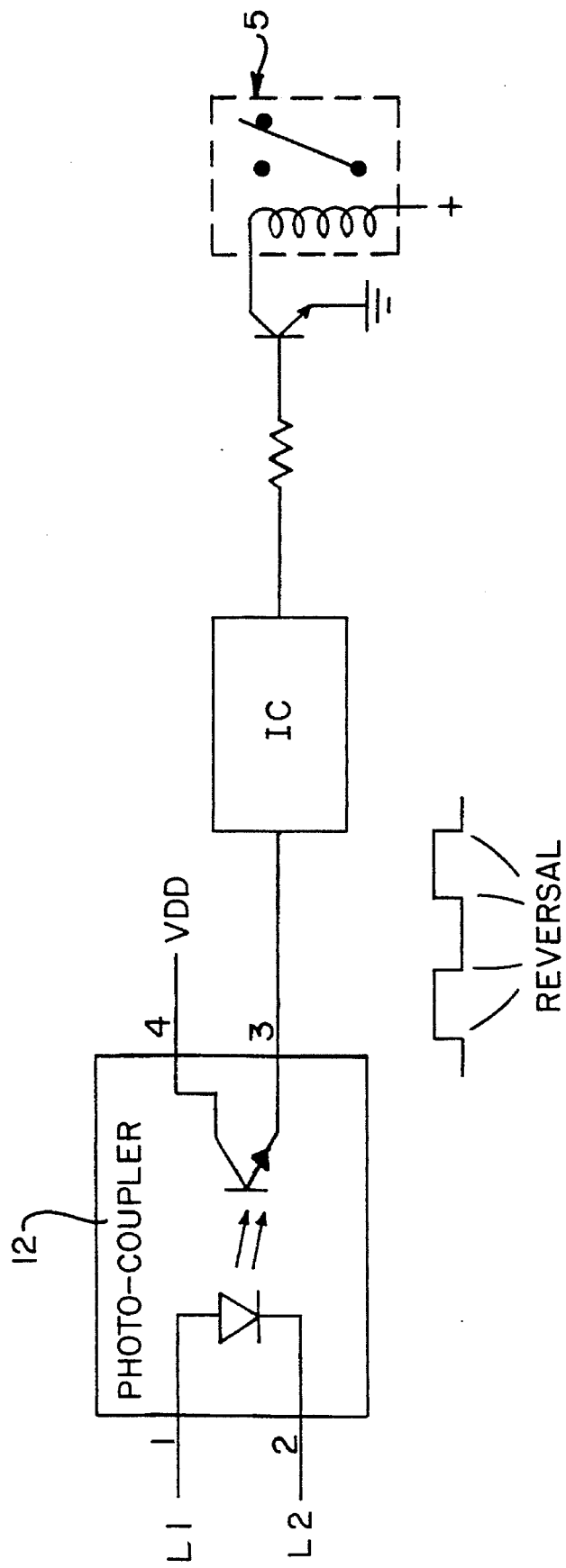

The present invention may use a photo-coupler 12 as shown in FIG. 9 to detect reversal of polarity upon ending of call. The feature is so constructed that first transition or last transition due to reversal of polarity from the hook-down at the second side telephone is caught in the form of pulse signals by which the hold-on setting release relay 5 shown in FIGS. 2 or 5 is actuated.

Figure 10:
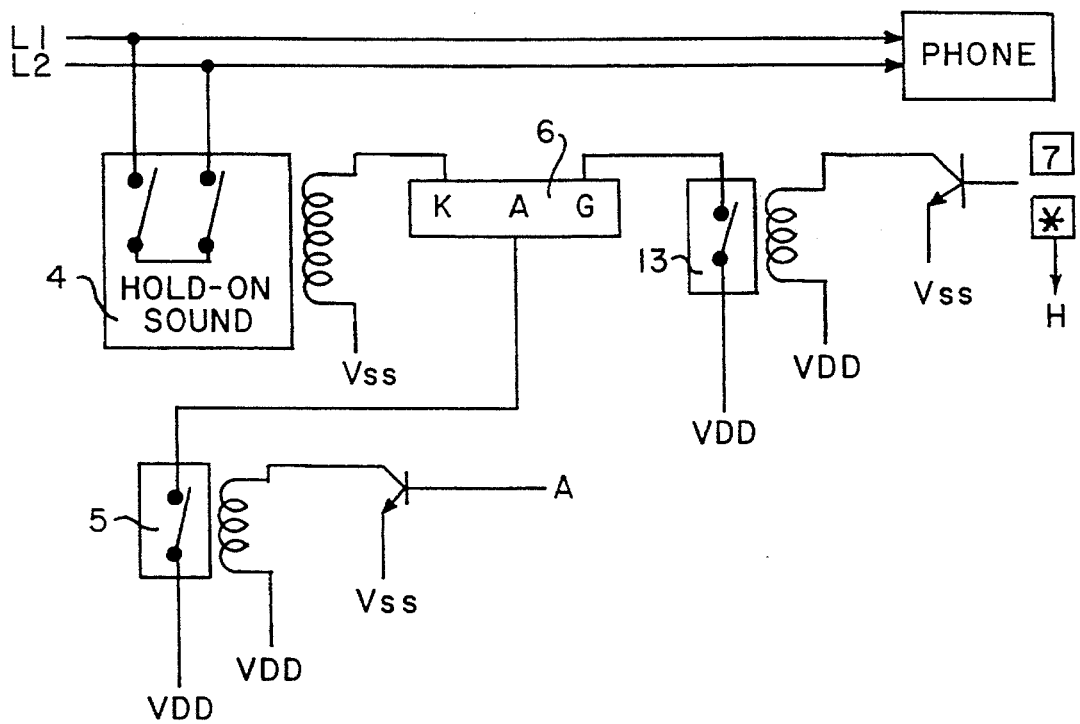
FIG. 10 is a circuit diagram showing further example of the present invention.

The aforesaid example uses the thyristor 6 for forming the hold-on loop and releasing the hold-on state. This feature may be modified as the circuit shown in FIG. 10, wherein pushbuttons 7 and * are depressed to actuate a hold-on setting startup relay 13 and allow electric current to flow through the gate C of the thyristor 6, thereby actuating the hold-on relay 4 to provide the hold-on state. Releasing the hold-on state is carried out by actuating the hold-on setting release relay 5. The hold-on setting release relay 5 is actuated by inputting to the part A the DTMF signals given when the pushbuttons 7 and * are depressed again, or signals to be emitted when the photocoupler IC 12 detects pulses due to polarity reversal from the hook-down at the second side telephone or the touch-tone decoder 10 detects busy-back tone 400 Hz, so that the hold-on relay 4 is reset to cause the hold-on state to be automatically released.

Figure 11:
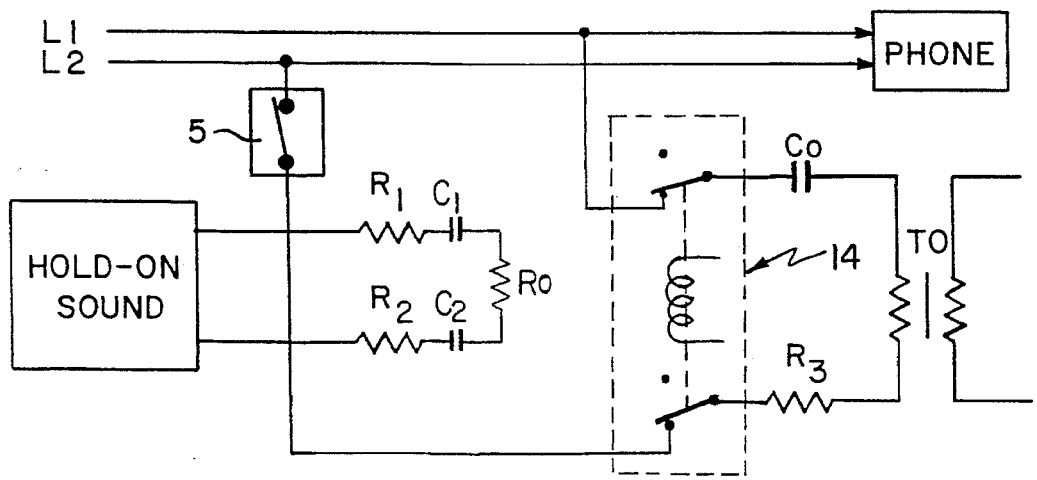
FIG. 11 is a circuit diagram showing the invention assembled in a telephone set body.
Figure 12A:
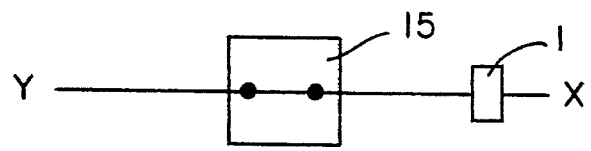
FIGS. 12(a)–12(e) are block diagrams showing a transfer method for an outside line call using the conference call system (i.e., the Trio-Phone Service by Nippon Telegraph and Telephone Corp.).
Figure 12B:
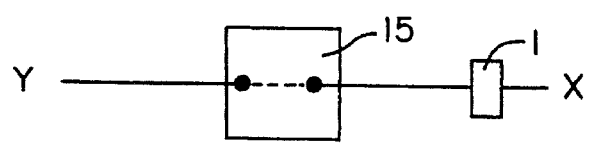
Figure 12C:
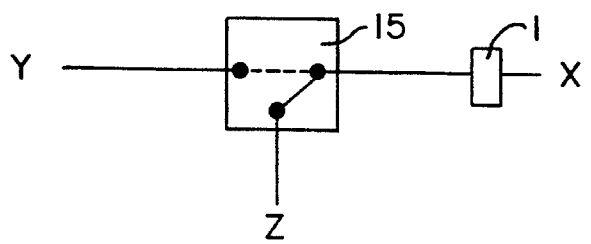
Figure 12D:
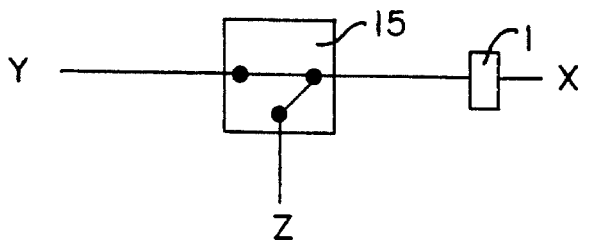
Figure 12E:
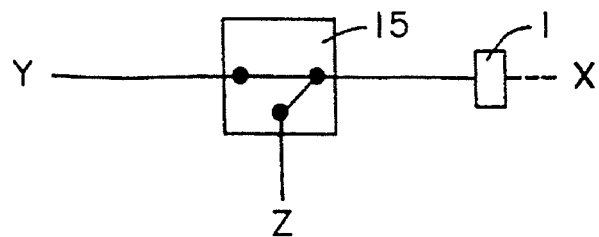

FIG. 11 shows a further modified example of the present invention, showing a circuit which when the telephone 3 is set to the hold-on state by depressing a hold-on button on the telephone 3, the circuit detects hook-down at the second telephone side to release the hold-on state. Generally, when the telephone is set to the hold-on state in relation to an outside line by use of the hold-on button on the telephone, electric potential on H line becomes middle level by Zener diode. The potential level is detected by a level sensing circuit to actuate the hold-on relay (H relay) 14 and cause the relay 14 to self-hold, so that the H relay 14 causes the outside line wire L1, L2 to connect the hold-on resistance $R_O$ to provide the hold-on state. Hence, the present example provides the hold-on setting release relay 5 on a part of the hold-on loop formed by the H relay 14, so that the hold-on setting release relay 5 is actuated by the foregoing touch-tone decoder 10 and photo-coupler IC 12 to release the hold-on state and automatically end the call, i.e., providing the clear-down state.

FIG. 12 shows a transfer method of an outside line call by providing the automatic release device 1 of the hold-on setting of outside line call according to the present invention and using the foregoing conference call system, such as Trio-Phone service, served by Telegraph and Telephone Corporations. The example shows the case that a subscriber X having the automatic release device 1 of the hold-on setting of outside line call and subscribed for the conference call system receives an outside line call from a transmitting person Y and transfers the outside line call to a third person Z (to which such call is to be transferred). This is, for example, such case that when the transmitting person Y telephones the subscriber (the receiving person) X (FIG. 12(a)), the person Z with whom the transmitting person Y want to talk is absent due to going out and required to be called up with any local telephones near the person Z or a portable telephone set he may carry with so as to cause him to talk with the transmitting person Y. First, the outside line call from the transmitting person Y is set to the hold-on state with the conference call system by Telephone Exchange 15 (FIG. 12(b)). This is carried out, for example, by depressing the plunger on the cradle for an instant (about 700 mmsec) (or depressing once a special "hook button" on a telephone). Then, the receiving person (subscriber) X calls up the third person Z (FIG. 12(c)) to inform him of the call from the transmitting person Y, and depresses the hook button again to have the state of three-persons call (FIG. 12(d)). In this instance, the receiving person X actuates the automatic release device 1 of hold-on setting of outside line call and sets the telephone 3 to the hold-on state, so that the call from the transmitting person Y is substantially transmitted to the third person Z (FIG. 12(c)). That is, in this state, when the person X is replaced the telephone receiver to the cradle, the call between the persons Y and Z can be continued and the person X is kept out of the call. After transfer of the call as above, when the transmitting person Y and the third person Z end talking and either of them replaces (hook-down) the receiver on the cradle, signals from the hook-down is detected by the sensing means to cause the hold-on state of the telephone 3 (at the receiving person X (subscriber)) to be automatically released.

In this case, when the A.C.relay 9 is provided as foregoing, either of the transmitting person Y and the third person Z can ring the bell of the telephone 3 to call back the receiving person X. Also, operation in relation to the conference call system is generally to depress the plunger on the cradle of the telephone 3 but alternatively may use the aforesaid special hook button provided on the telephone for the purpose of the conference call system.

Figure 13:
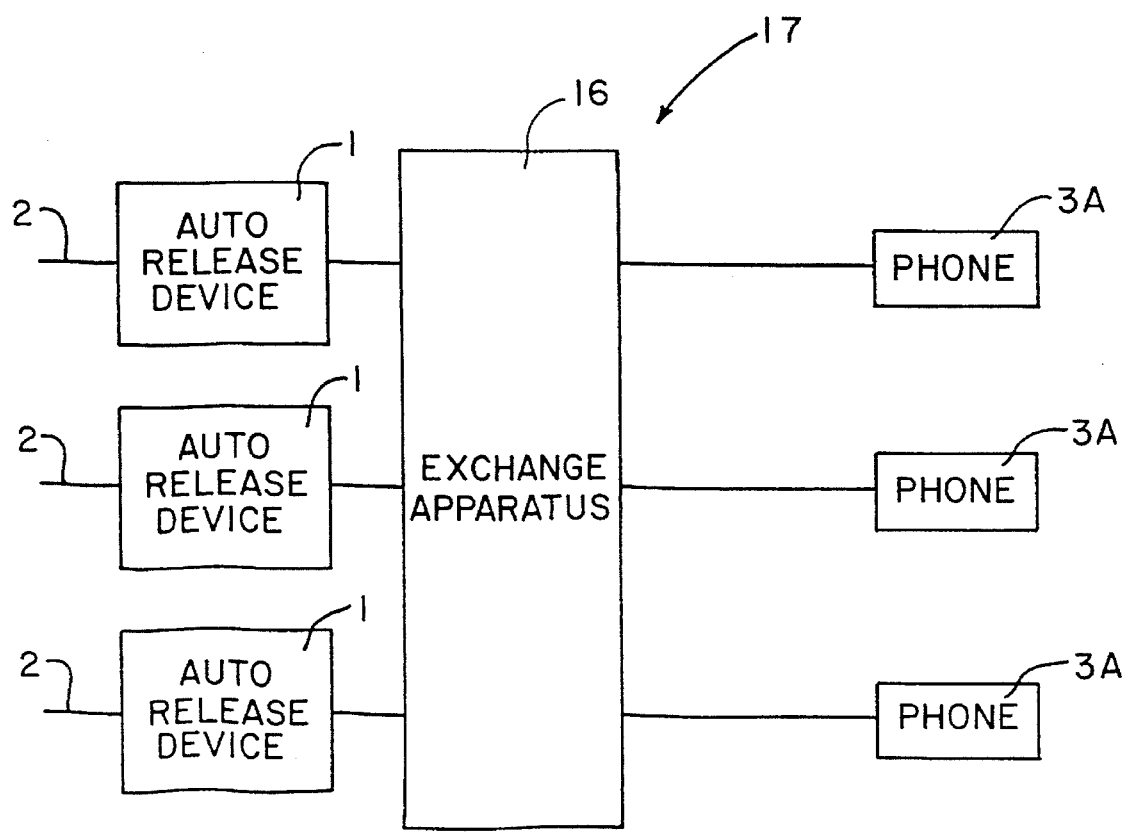
FIG. 13 is a schematic diagram showing modified connection of the automatic release device of hold-on setting of outside line call according to the present invention.

The above examples refer to the case the receiving person X possesses one telephone set. The automatic release device 1 according to the present invention can, as seen in FIG. 13, be incorporated in a system including a telephone facility 17 comprising users telephone exchange apparatus 16 (main exchange) controlling a plurality of extension telephones 3A (three telephones shown in the drawing) and a plurality of outside lines 2 (three lines shown in the drawing) connected to the telephone facility 17. In this case, the automatic release devices 1 are disposed before outside line input terminals of the users telephone exchange apparatus 16 (i.e., the devices 1 are located at the side of the telephone facility 17 nearer Telephone Exchange).

Also, to provide actuation of the automatic release device 1 according to the present invention in every kind of call including the foregoing transfer of outside line call using the Trio-Phone Service, the automatic release devices 1 are to be connected to every outside line wires 2. When the automatic release device 1 is integrally assembled in the users telephone exchange apparatus, the above connecting work can be carried out simply and the users telephone exchange apparatus can be added with values.

As seen from the above, the automatic release device of hold-on state of outside line call according to the present invention has the following excellent advantages.

(1) The hold-on state can be released by the clear-down signals emitted by the second (or third) side telephone. Hence, when the person at the first side happens to forget to release the first side telephone from the hold-on state, that the line is kept busy uselessly can be avoided and a corresponding telephone to the line can receive other calls.

(2) The automatic release device can be operated simply and be readily connected to commercially available telephone sets.

(3) The automatic release device when assembled in the telephone body provides a telephone having function of automatically releasing the hold-on setting as an added value to the telephone.

(4) When a first telephone is set to be called up by a second side telephone's operation for ringing the bell of the first telephone in the state of hold-on setting, the second side's intention can be indicated to the first side, such as urging release of the hold-on state or leaving a message with any other person than an objective one.

(5) In the case using the conference call system (The trio-phone service in Japan) served by Telegraph and Telephone Corps., after the first side person is set to provide the state enabling three-persons call on the outside line, when he does not participate in the three-persons call (or wants to transfer the call on the line to the other), the first side person's actuation of the hold-on relay for setting the hold-on state enables the remaining persons to talk together on the outside line even when he replaces the receiver on the cradle. Also, when the talk between that remaining persons ends, the hold-on state can be automatically released and that outside line can be automatically vacant. Also, use of the function of ringing the bell of the first side telephone causes the first side telephone to be called up by ringing of the bell through emission of DTMF signals from either of the second and third sides related to the outside line call, thereby allowing the first side person (telephone) to return to the three-persons call, (6) The transfer method of outside call using the conference call system (Trio-Phone service) may be usable even with a single line (outside line) and can largely reduce running cost in comparison with the conventional transfer method requiring two lines (two outside lines).

What I claim is:

1. An automatic release device for automatically releasing hold-on setting of an outside line call, the automatic release device being connected between outside line wires and outside line input terminals at a first telephone enabling use of an outside line to receive other calls wherein said first telephone when having an outside line call from a second telephone and set to the hold-on state can be released from the hold-on setting to release the line by use of a sensing circuit detecting signals based on the on-hook at the second telephone side and a release circuit for releasing the first telephone.

2. An automatic release device for automatically releasing the hold-on setting of an outside line call, the automatic release device being connected between outside line wires and outside line input terminals at a first telephone having an outside line call from a second telephone through the outside line wire, the automatic release device being provided with: a hold-on relay which is actuated by DTMF signals sent by the first or second telephone during the outside line call to set the first telephone to the hold-on state in relation to the outside line call and a release relay which is actuated by the DTMF signals sent by the first or second telephone to release the first telephone from the hold-on state, and a sensing means for detecting signals based on on-hook of the second telephone when the first telephone is in the hold-on state, the sensing means being adapted to actuate the release relay to cut a hold-on loop for the outside line call formed by the hold-on relay.

3. An automatic release device for automatically releasing the hold-on setting of an outside line call as set forth in claim 1, the automatic release device being provided with DTMF signals and an A.C. input rolay connected between outside line wire and outside line input terminals at a first telephone having an outside line call from a second telephone through the outside line wire, wherein after the first telephone having an outside call from the second telephone through the outside line wire is set to the hold-on state in relation to the outside line wire, the DTMF signals emitted from the second telephone actuates the A.C. input relay which rings a bell of the first telephone.

4. A transfer method for an outside line call, by using a conference call system provided by a telephone company wherein a running outside line call received from a second telephone by a first telephone through outside line wire is set to the hold-on state in the conference call system by a Telephone Exchange while any other third line is called up, then, that outside line call is released from the hold-on state by the Telephone Exchange to enable the conference call, and also using a hold-on relay, which is connected between the outside line wire and outside line input terminals at the first telephone and to be actuated by DTMF signals sent by the first telephone or the third telephone subjected to the conference call, in order to set the first telephone to the hold-on state in relation to the outside line wire so as to allow persons at the second and the third telephones to talk with each other, wherein a sensing means for detecting signals based on on-hook of either of the second and third telephones is used to actuate a hold-on setting release relay, which is adapted to cut a hold-on loop formed by the hold-on relay, to release the first telephone from the hold-on setting in relation to the outside line wire.

5. A transfer method for an outside line call as set forth in claim 4, using DTMF signals and an A.C. input relay connected between outside line wire and outside line input terminals at a first telephone having an outside line call from a second telephone through the outside line wire, wherein the DTMF signals emitted from either of the second and third telephones during the call therebetween actuates the A.C. input relay which rings a bell of the first telephone set to the hold-on state by the hold-on relay.

* * * * *